(12) United States Patent
Bertolotti et al.

(10) Patent No.: US 7,229,251 B2
(45) Date of Patent: Jun. 12, 2007

(54) ROTOR HUB FAIRING SYSTEM FOR A COUNTER-ROTATING, COAXIAL ROTOR SYSTEM

(75) Inventors: Fabio P. Bertolotti, South Windsor, CT (US); Mark W. Scott, Bethany, CT (US); Brian E. Wake, South Glastonbury, CT (US); T. Alan Egolf, Glastonbury, CT (US); Duane C. McCormick, Colchester, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 119 days.

(21) Appl. No.: 11/141,246

(22) Filed: May 31, 2005

(65) Prior Publication Data

US 2006/0269411 A1    Nov. 30, 2006

(51) Int. Cl.
*B64C 27/50* (2006.01)
(52) U.S. Cl. ............... 416/33; 416/128; 416/134 A; 416/204 R
(58) Field of Classification Search ............ 244/17.23; 416/33, 124, 128, 134 A, 204 R
See application file for complete search history.

(56) References Cited

U.S. PATENT DOCUMENTS

| | | | | |
|---|---|---|---|---|
| 2,323,786 | A | * | 7/1943 | Beisel .................... 451/38 |
| 2,397,632 | A | * | 4/1946 | Stuart ................. 244/17.23 |
| 3,149,803 | A | * | 9/1964 | Petrides et al. .......... 244/17.23 |
| 3,894,703 | A | * | 7/1975 | Velasquez ............. 244/17.23 |
| 4,123,018 | A | * | 10/1978 | Tassin de Montaigu . 244/17.23 |
| 4,478,379 | A | * | 10/1984 | Kerr ....................... 416/204 R |
| 5,289,994 | A | * | 3/1994 | Del Campo Aguilera .................. 244/17.23 |
| 5,727,754 | A | * | 3/1998 | Carter, Jr. ............... 244/17.11 |
| 7,083,142 | B2 | * | 8/2006 | Scott ....................... 416/128 |

OTHER PUBLICATIONS

Title: Summary of Rotor Hub Drag Data; By: G.N. Keys and H.J. Rosenstein; Dated: Mar. 1978.
Title: Experimental Investigation of Advanced Hub and Pylon Fairing Configurations to Reduce Helicopter Drag; By: D.M. Martin, R.W. Mort, L.A. Young, P.K. Squires; Dated: Sep. 1993, NASA Technical Memorandum 4540.
Title: The First 50 Years Were Fine . . . But What Should We Do for an Encore?—The 1994 Alexander A. Nikolsky Lecture; By: Evan A. Fradenburgh; Journal of the American Helicopter Society; Jan. 1995.
Title: Rotorcraft Hub Shroud; By: LTC Chip Lunn; Brannon Industries; Apr. 11, 2006.

* cited by examiner

*Primary Examiner*—Igor Kershteyn
(74) *Attorney, Agent, or Firm*—Carlson, Gaskey & Olds

(57) ABSTRACT

A rotor hub fairing system includes an upper hub fairing, a lower hub fairing and a shaft fairing therebetween. The rotor hub fairing system is sized and configured to reduce the overall drag on a dual, counter-rotating, coaxial rotor system. Preferably, the rotor hub fairing is fully integrated. The shaft fairing preferably includes a minimal thickness at the midsection to reduce drag with an increasing thickness adjacent the upper and lower hub fairings to reduce the flow separation on the hub fairing surfaces without overly excessive drag. Other aerodynamic structures, such as a horizontal splitter and/or a plurality of turning vanes may be mounted to the shaft fairing to facilitate flow around the upper and lower hub fairings to reduce flow separation and drag.

29 Claims, 18 Drawing Sheets

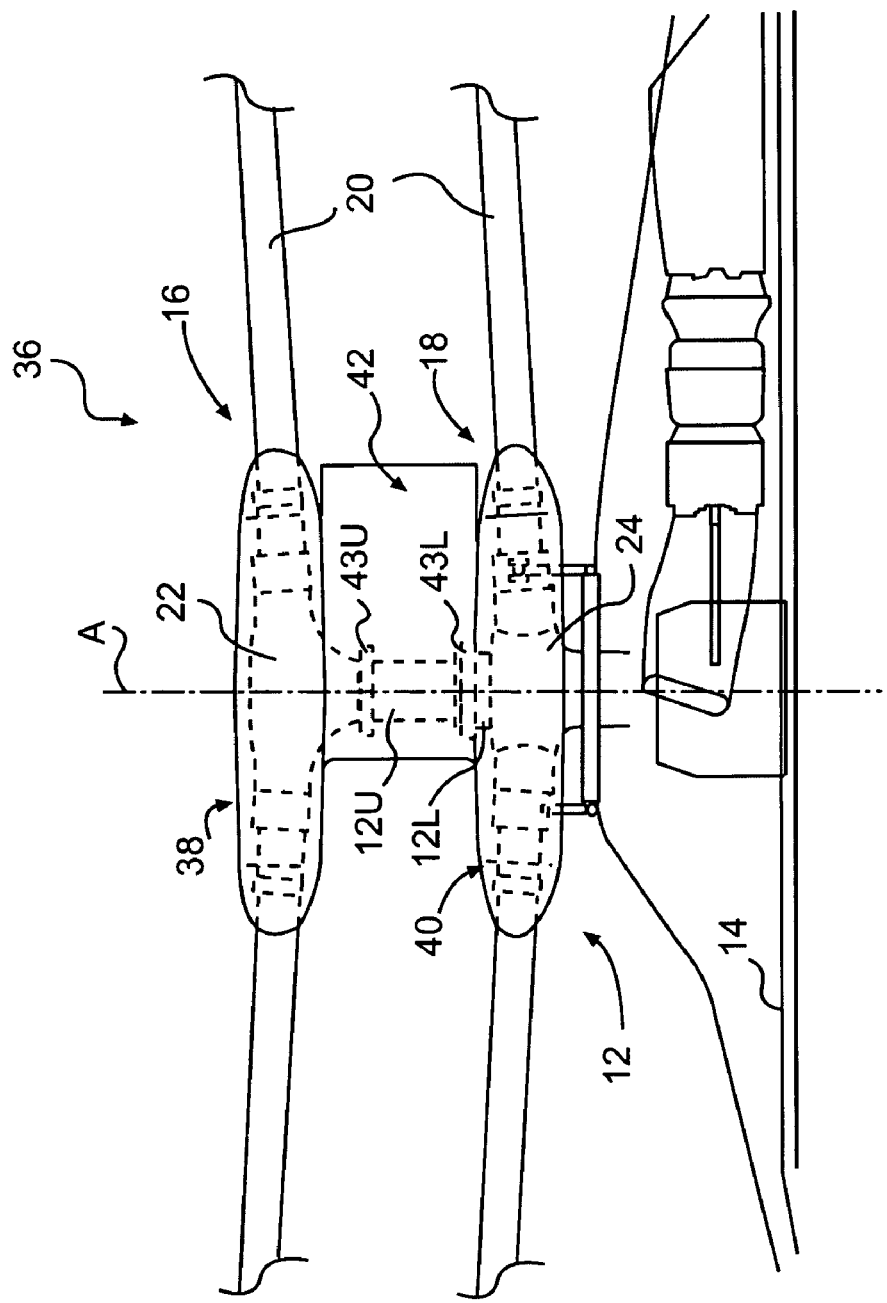

ROTOR HUB FAIRING SYSTEM FOR A COUNTER-ROTATING, COAXIAL ROTOR SYSTEM

BACKGROUND OF THE INVENTION

The present invention is directed to a rotor hub fairing system, and more particularly, to an integrated rotor hub fairing which is sized and configured to reduce overall drag for a high-speed rotary-wing aircraft a counter-rotating, coaxial rotor system.

Typically, the aerodynamic drag associated with a rotor hub on a rotary wing aircraft is a significant portion of the overall aircraft drag, typically 25% to 30% for conventional single-rotor helicopters. The rotor system drag increases significantly for a rotary wing aircraft having a counter-rotating, coaxial rotor system primarily due to the extra rotor hub and the interconnecting shaft between the upper and lower rotor systems. For high-speed rotary wing aircraft, the increased drag resulting from the counter-rotating, coaxial rotor system may result in a relatively significant power penalty.

The aerodynamic drag of the dual counter-rotating, coaxial rotor system is generated by three main components—the upper hub, the lower hub, and the interconnecting rotor shaft assembly. The drag contribution may be approximately 40% for each of the hubs, and 20% for the interconnecting shaft assembly.

Accordingly, it is desirable to provide a drag-reducing rotor hub fairing system for a rotary wing aircraft having a counter-rotating, coaxial rotor system.

SUMMARY OF THE INVENTION

A rotor hub fairing system for a dual, counter-rotating, coaxial rotor system according to the present invention generally includes an upper hub fairing, a lower hub fairing and a shaft fairing located therebetween. The rotor hub fairing system is sized and configured to reduce the overall drag on the rotor system. Preferably, the rotor hub fairing system is an integrated system that is refined through analysis and/or testing to reduce overall drag. The rotor hub fairing is viewed as a system for drag reduction, rather than drag reduction by the individual components. The rotor hub fairing system reduces drag by minimizing excessive separation in the surface junction areas. Furthermore, by introducing an integrated design, drag is reduced by accounting for the interference effects and optimal surface distributions for each rotor system configuration. The use of fillets at the intersecting surfaces further reduces the overall drag.

The shaft fairing preferably includes a minimal thickness at the shaft fairing's midsection. The outer shaft fairing sections on each side of the shaft fairing midsection and adjacent the upper and lower hub fairings define a thickness greater than the shaft fairing's midsection. Minimizing the thickness at the midsection reduces drag while increasing the thickness at the outer shaft fairing sections reduces the flow separation on the hub fairing surfaces.

According to another embodiment of the present invention, the rotor hub fairing system may include a horizontal wing-like splitter airfoil which extends from the shaft fairing, preferably at the midsection. The splitter airfoil includes an airfoil profile which reduces drag and sensitivity to angle of attack variations. The airfoil shape of the splitter airfoil may provide a fixed or adjustable angle of attack to specifically tailor the rotor hub wake in a direction that reduces airframe and tail vibration.

According to yet another embodiment of the present invention, the rotor hub fairing system may include a plurality of turning vanes which facilitate flow around the aft end of the upper and lower hub fairings to reduce flow separation and drag. The rotor hub fairing system may include a plurality of turning vanes located adjacent the lower hub, a plurality of turning vanes located adjacent the upper hub or any combination thereof. The upper turning vane may be located adjacent the upper hub fairing and includes a camber which preferably follows the contour of the upper hub fairing while the lower turning vane may be located adjacent the lower hub fairing and preferably includes a camber which follows the contour of the lower hub fairing.

The present invention therefore provides a drag-reducing rotor hub fairing system for a rotary wing aircraft having a counter-rotating, coaxial rotor system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1E is a partial phantom side view of an integrated rotor hub fairing system designed according to the present invention;

DETAILED DESCRIPTION OF THE PREFERRED EMBODIMENT

Figure 1A:
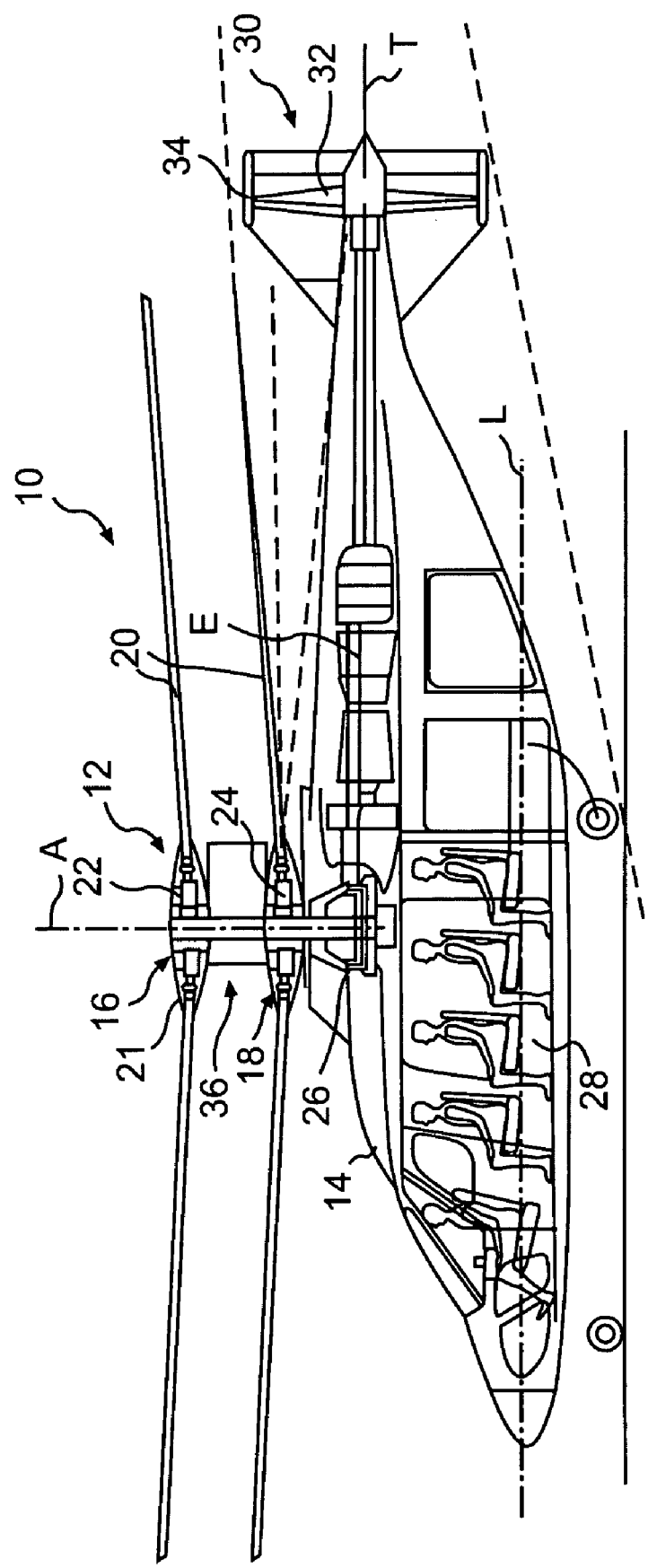
FIGS. 1A–1B is a general schematic view of an exemplary rotary wing aircraft embodiment for use with present invention.
Figure 1B:
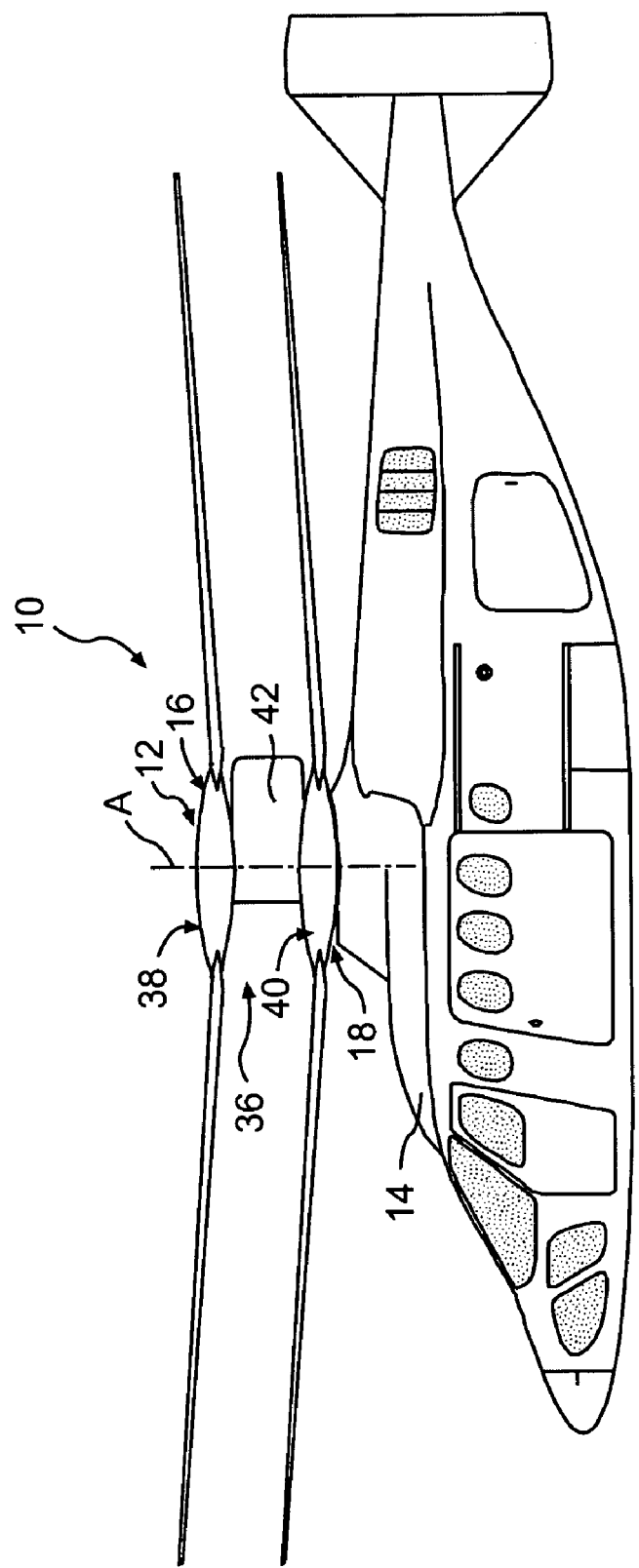

FIGS. 1A and 1B illustrate an exemplary vertical takeoff and landing (VTOL) high speed rotary-wing aircraft 10 having a dual, counter-rotating, coaxial rotor system 12. The aircraft 10 includes an airframe 14 which supports the dual, counter rotating, coaxial rotor system 12 as well as a translational thrust system 30 which provides translational thrust generally parallel to an aircraft longitudinal axis L. Although a particular aircraft configuration is illustrated in the disclosed embodiment, other machines will also benefit from the present invention.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about a rotor axis of rotation A. A plurality of the main rotor blades 20 project substantially radially outward from the hub assemblies 22, 24 and are connected thereto in any manner known to one of ordinary skill in the art (schematically illustrated at 21). Any number of blades 20 may be used with the rotor system 12.

A main gearbox 26 which may be located above the aircraft cabin 28 drives the rotor system 12. The optional translational thrust system 30 may be driven by the same main gearbox 26 which drives the rotor systems 16, 18. The main gearbox 26 is driven by one or more engines (illustrated schematically at E; two shown). As shown, the gearbox 26 may be interposed between one or more gas turbine engines E, the rotor system 12 and the translational thrust system 30.

The translational thrust system 30 may be mounted to the rear of the airframe 14 with a rotational axis T oriented substantially horizontal and parallel to the aircraft longitudinal axis L to provide thrust for high-speed flight. Preferably, the translational thrust system 30 includes a pusher propeller 32 mounted within an aerodynamic cowling 34.

Referring to FIG. 1B, the rotor system 12 includes a rotor hub fairing system 36, preferably an integrated rotor hub fairing system, generally located between and around the upper and lower rotor systems 16, 18 such that the rotor hubs 22, 24 may be at least partially contained therein. Applicant has discovered that the aerodynamic drag on a counter-rotating, coaxial rotor system 12 may be dominated by the pressure drag resulting from large-scale flow separation; typically, the skin-friction drag may contribute about 10% of overall aircraft drag. The rotor hub fairing system 36 achieves a significant drag reduction in which large-scale flow separation is greatly reduced.

Figure 1D:
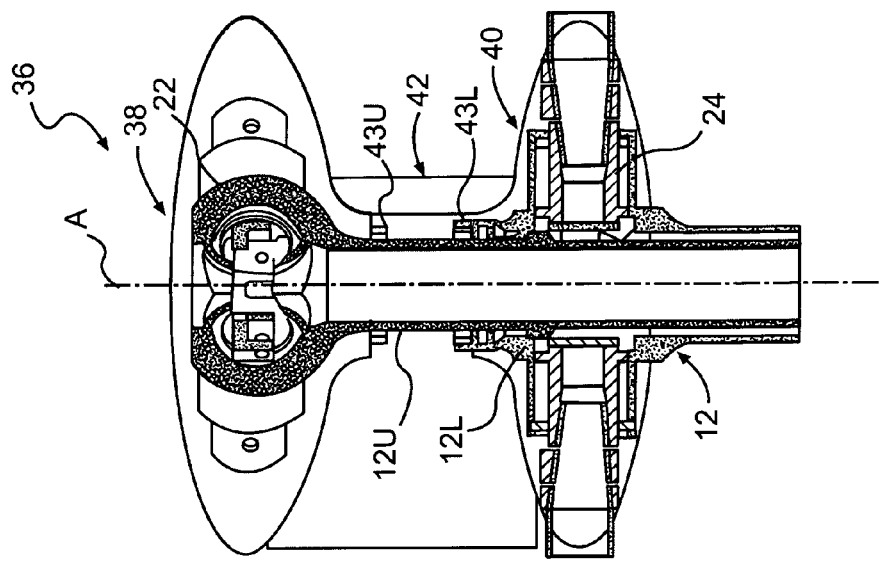
FIG. 1D is a sectional side view of the integrated rotor hub fairing system taken along line D–D in FIG. 1C.
Figure 1C:
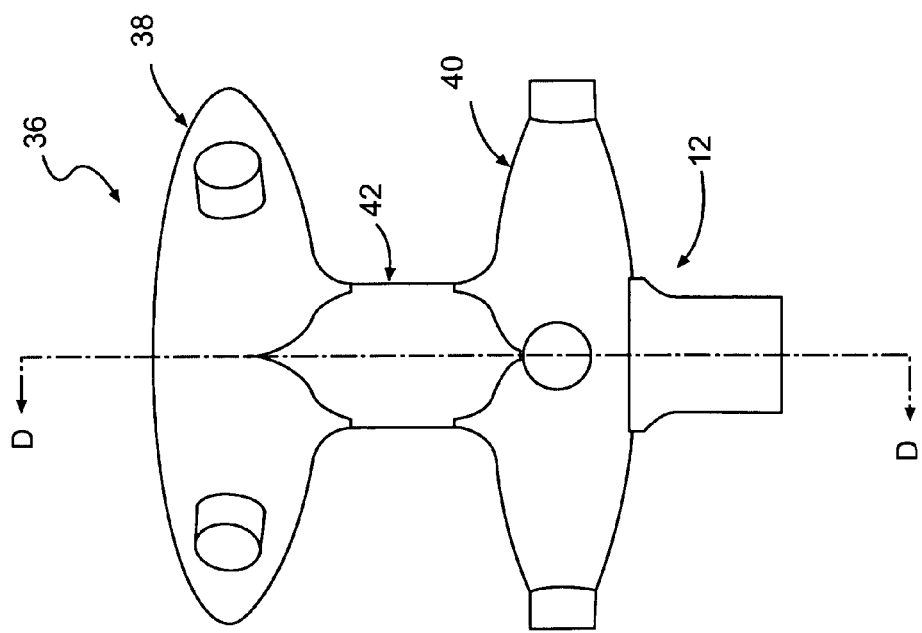
FIG. 1C is a side view of an integrated rotor hub fairing system designed according to the present invention.

The rotor hub fairing system 36 generally includes an upper hub fairing 38, a lower hub fairing 40 and a shaft fairing 42 therebetween. Preferably, the rotor hub fairing system 36 is integrated to reduce interference effects between the separate fairings 38, 40, 42 and eliminate excessive separation in the junction areas (FIGS. 1C and 1D). The term "integrated" as utilized herein means that the shaft fairing 42 generally follows the contours of the upper hub fairing 38 and the lower hub fairing 40 at the rotational interface therebetween. The rotor hub fairing system 36 further reduces drag by accounting for the interference effects to optimize surface distributions for the specific installation. In addition, detailed surface modifications of intersecting surfaces including fillets and modified interface shapes may be utilized to further optimize drag reduction.

Referring to FIG. 1E, the shaft fairing 42 is preferably attached to the counter-rotating, coaxial rotor system 12 through a bearing arrangement 43U, 43L (illustrated schematically) such that the shaft fairing 42 is free to align with the relative wind. Preferably, an upper and lower bearing 43U, 43L is located adjacent an upper and a lower portion of the shaft fairing 42. The upper bearing 43U is attached to one rotor shaft 12U while the lower bearing 43L attached to the other rotor shaft 12L such that the bearings are counter rotating and the net bearing drag is relatively low to facilitate alignment of the shaft fairing 42 to the relative wind.

Figure 2A:
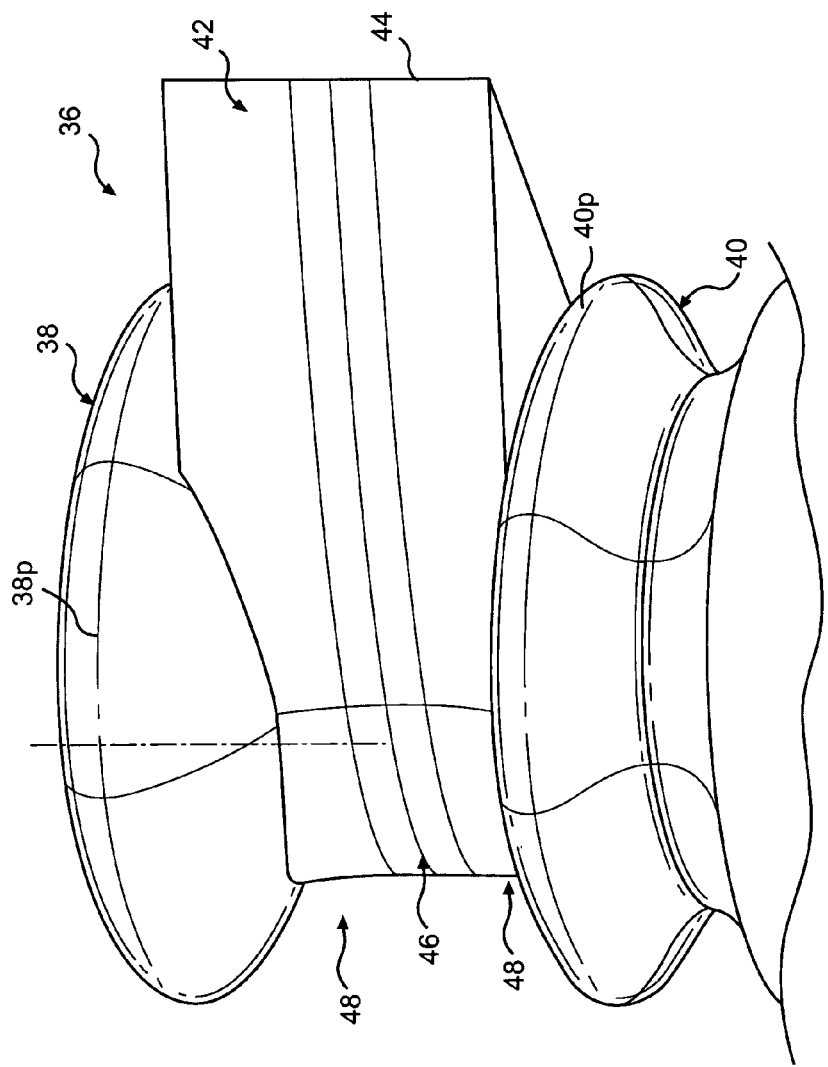
FIG. 2A is an oblique aft perspective view of an integrated rotor hub fairing system.
Figure 2B:
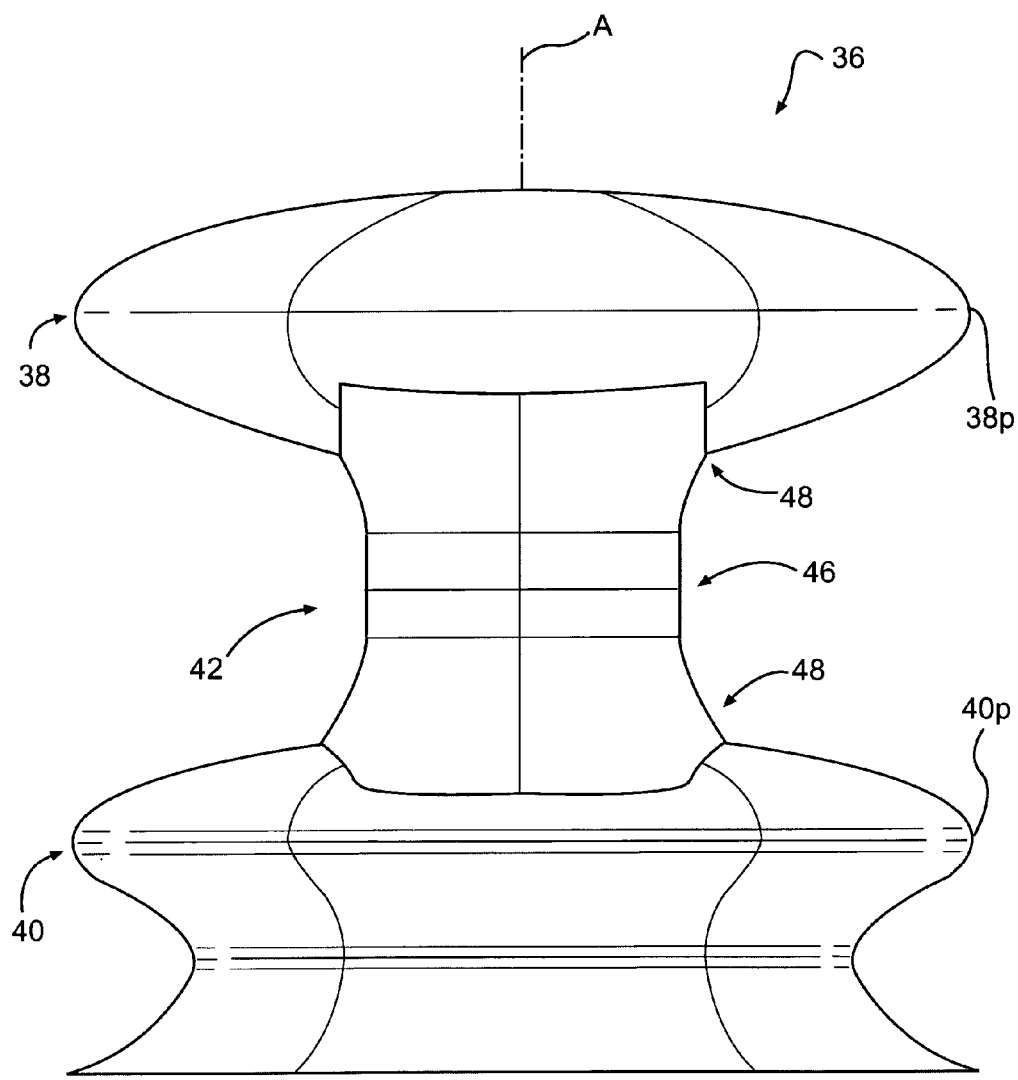
FIG. 2B is a rear perspective view of the integrated rotor hub fairing system of FIG. 2A.

Referring to FIG. 2A, one embodiment of the rotor hub fairing system 36 is shown. Preferably, the rotor hub fairing system 36 includes a shaft fairing 42 that has a thickness distribution between the upper and lower rotor hub fairings 38, 40 with a minimal thickness at the shaft fairing's midsection 46 such that the shaft fairing 42 has an approximate hourglass like shape (FIG. 2B). The outer shaft fairing sections 48 adjacent the upper and lower hubs 38, 40 define a thicknesses greater than the shaft fairing's midsection 46 (also schematically illustrated in FIG. 2C). Reducing the thickness at the shaft faring's midsection 46 reduces drag while increasing the thickness at the outer shaft fairing sections 48 reduces the flow separation on the upper and lower hub fairings 38, 40, without creating overly excessive drag on the hub fairing system 36 by reducing the extent of flow separation (illustrated as shaded area in FIG. 2D). As readily understood by one of ordinary skill in the art, the shaft fairing may incorporate other shapes, aside from an hourglass shape, and still be consistent with the present embodiment. Preferably, as previous stated, the shaft fairing 42 is integrated with the upper hub fairing 38 and the lower hub fairing 40 to further reduce overall drag.

The shaft fairing 42 may also include a trailing edge 44 that extends aft of a periphery 38p, 40p defined by the upper hub fairing 38 and the lower hub fairing 40 which substantially reduces pressure drag. It should be noted that although, the shaft fairing 42 may generate an increase in accompanied skin-friction drag increase due to increase in surface area, the reduced pressure drag results in a significant overall drag reduction. Regarding shaft fairing chord/rotor hub fairing diameter (c/D), the shaft fairing 42 defines a preferred shaft fairing chord length range between c=0.90×D to 1.25×D and most preferably between 110% and 120% of the rotor hub fairing diameter (D). With a pitch axis P (FIG. 2C) defined at a quarter chord (c/4) location, the shaft fairing length (L) that extends beyond the hub periphery 38p, 40p may be defined by the equation:

$$L = (0.75 * (c/D) - 0.5) * D.$$

Figure 2C:
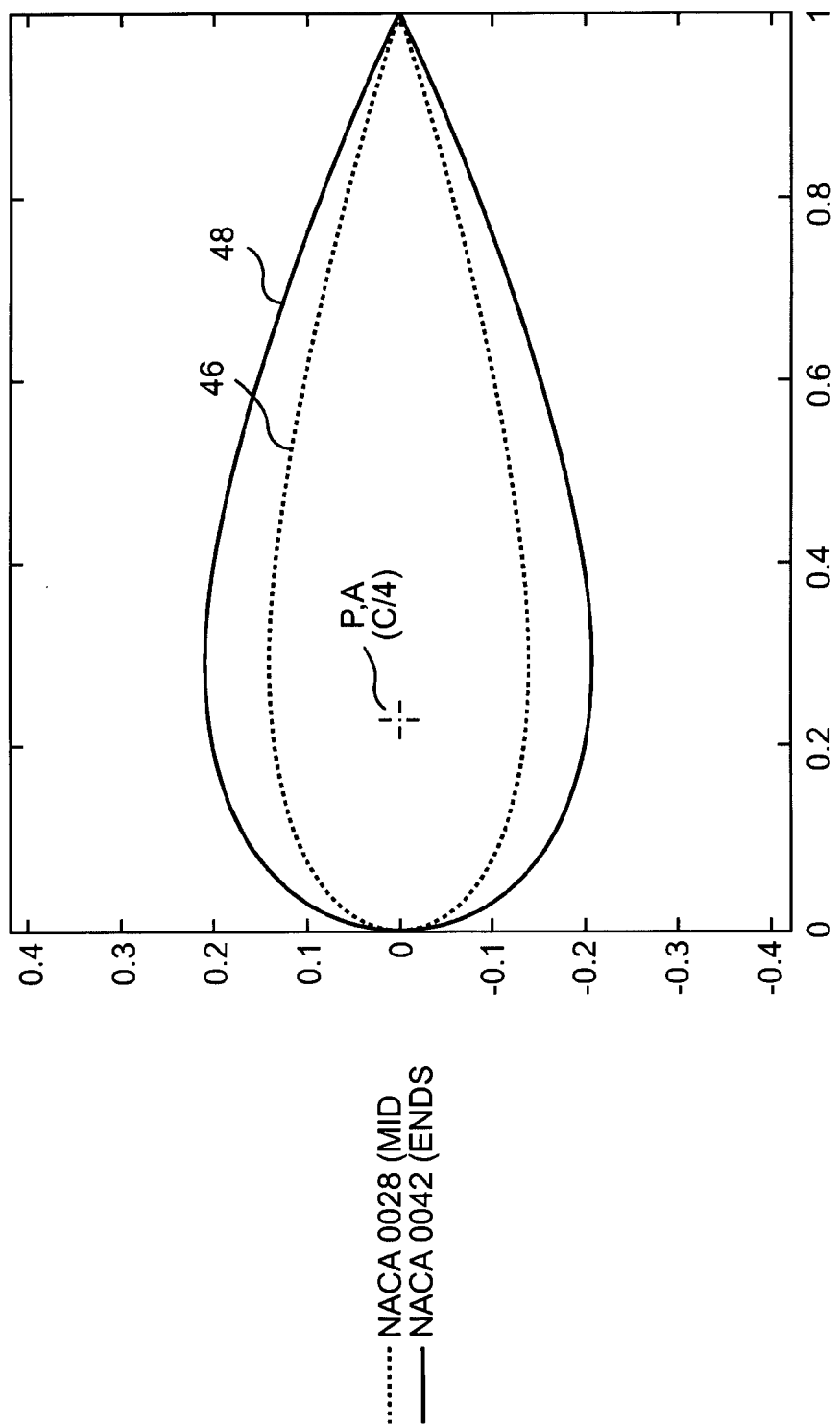
FIG. 2C is a schematic view of the airfoil shapes utilized with the shaft fairing of the integrated rotor hub fairing system of FIG. 2A.
Figure 2D:
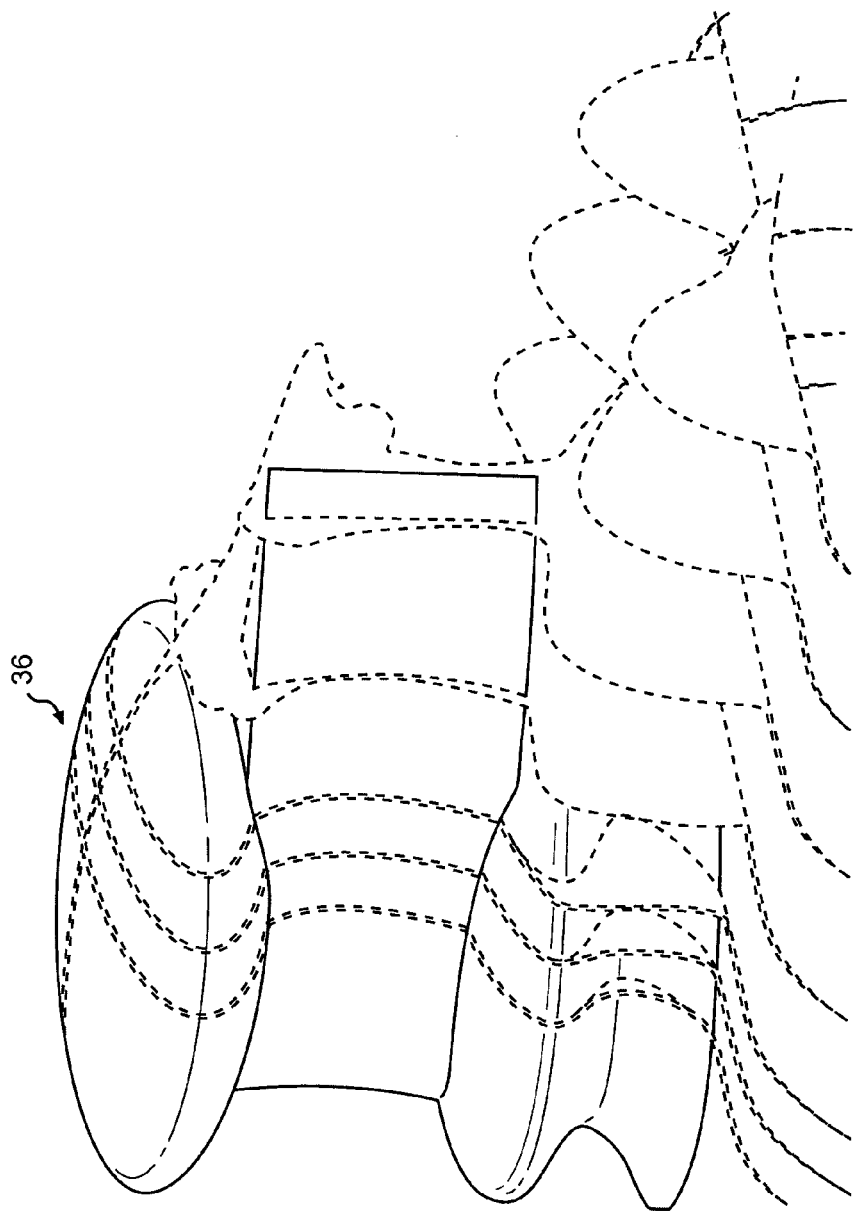
FIG. 2D is a computed total pressure contour produced by the rotor hub fairing system of FIG. 2A.

Referring to FIG. 2C, the shaft fairing 42 preferably defines airfoil shapes proportionate with NACA 0028 and NACA 0042 series airfoils along the shaft fairing's midsection 46 and the outer section shaft fairing 48, respectively. The shaft fairing 42 preferably defines a percent thickness, i.e., % thickness/(chord length), of 24% at the shaft fairing midsection 46 and 42% at the outer section 48. It should be understood that other airfoil shapes are also usable with the present invention.

Preferably, the shaft fairing 42 includes a symmetric aft thickness distribution which reduces pressure drag on the upper and lower hub fairings 38, 40. Most preferably, the shaft fairing 42 locates the pitch axis P at the quarter chord (c/4) location. The pitch axis P is preferably coaxial with the rotor axis of rotation A.

By integrating the rotor hub fairing system 36, optimizing the interferences between the shaft fairing 42, the upper hub fairing 38 and the lower hub fairing 40, modifying the contour and airfoil shape of the shaft fairing 42, Applicant has realized a net drag reduction of approximately 54%, relative to previous hub fairings, and 68% reduction relative to the unfaired (bare) rotor hub system. Applicant has further reduced drag on the uppermost areas of the rotor system 12, i.e., the upper hub fairing 38 and the shaft fairing 42, by approximately 66%, relative to previous hub fairings, and about 74% relative to the bare hub.

Figure 3A:
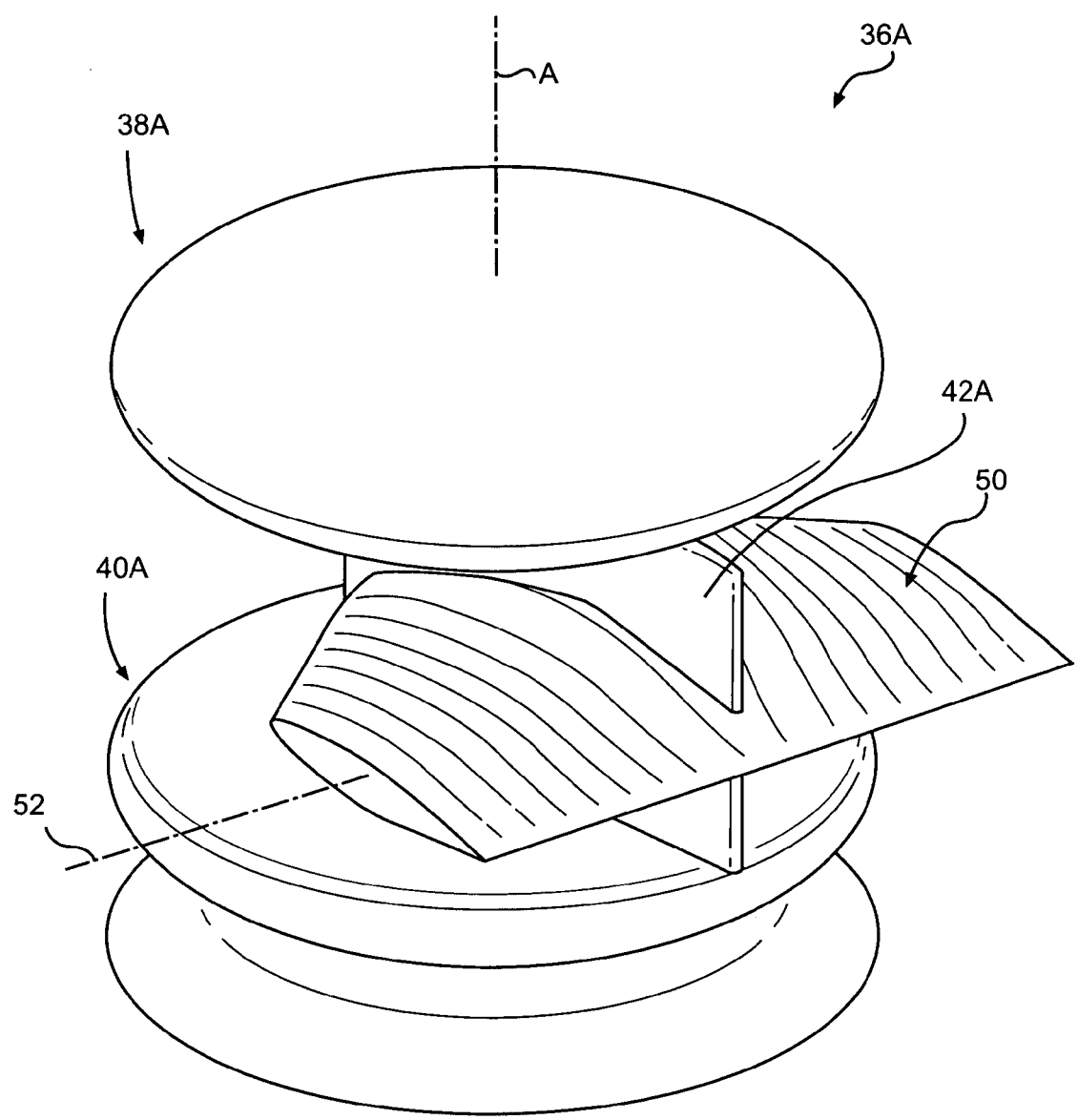
FIG. 3A is an oblique top perspective view of another integrated rotor hub fairing system with a splitter airfoil.

Referring to FIG. 3A, another rotor hub fairing system 36A generally includes an upper hub fairing 38A, a lower hub fairing 40A and a shaft fairing 42A connected therebetween. The rotor hub fairing system 36A further includes a horizontal wing-like splitter airfoil 50 which extends from the shaft fairing 42A.

The splitter airfoil 50 preferably extends from the shaft fairing 42A between the upper and lower hub fairings 38A, 40A. The splitter airfoil 50 defines a pitching axis 52 which is generally transverse to the rotor axis of rotation A. It should be understood that a contoured shaft fairing midsection 46 as described with reference to the FIG. 2 embodiment may additionally be utilized. Furthermore, as previous stated, the shaft fairing 42A may be integrated with the upper hub fairing 38A and the lower hub fairing 40A to further reduce overall drag. The splitter airfoil 50 may also be made integral with the shaft fairing 42A.

Figure 3B:
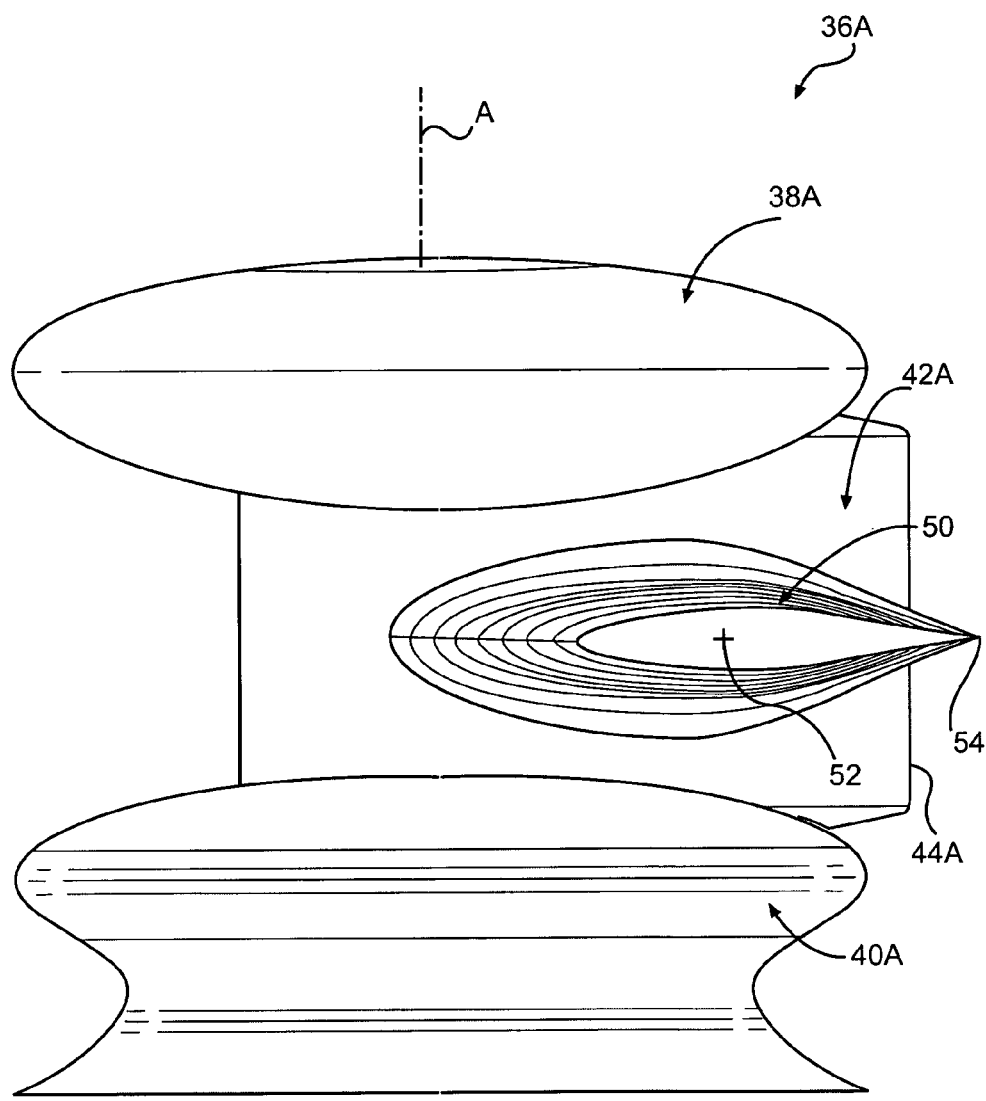
FIG. 3B is a side view of the integrated rotor hub fairing system of FIG. 3A.

Preferably, the splitter airfoil 50 includes an airfoil profile which reduces drag and sensitivity to angle of attack variations expected to occur below the rotor hub fairing system 36A. The splitter airfoil 50 preferably defines a peak thickness near an aft periphery of the rotor hub fairings 38A, 40A (FIG. 3B). That is, the splitter airfoil 50 includes an airfoil shape that has a maximum thickness near mid-chord. The splitter airfoil 50 may also include a splitting airfoil trailing edge 54 which extends aft of a shaft fairing trailing edge 44A.

Figure 3C:
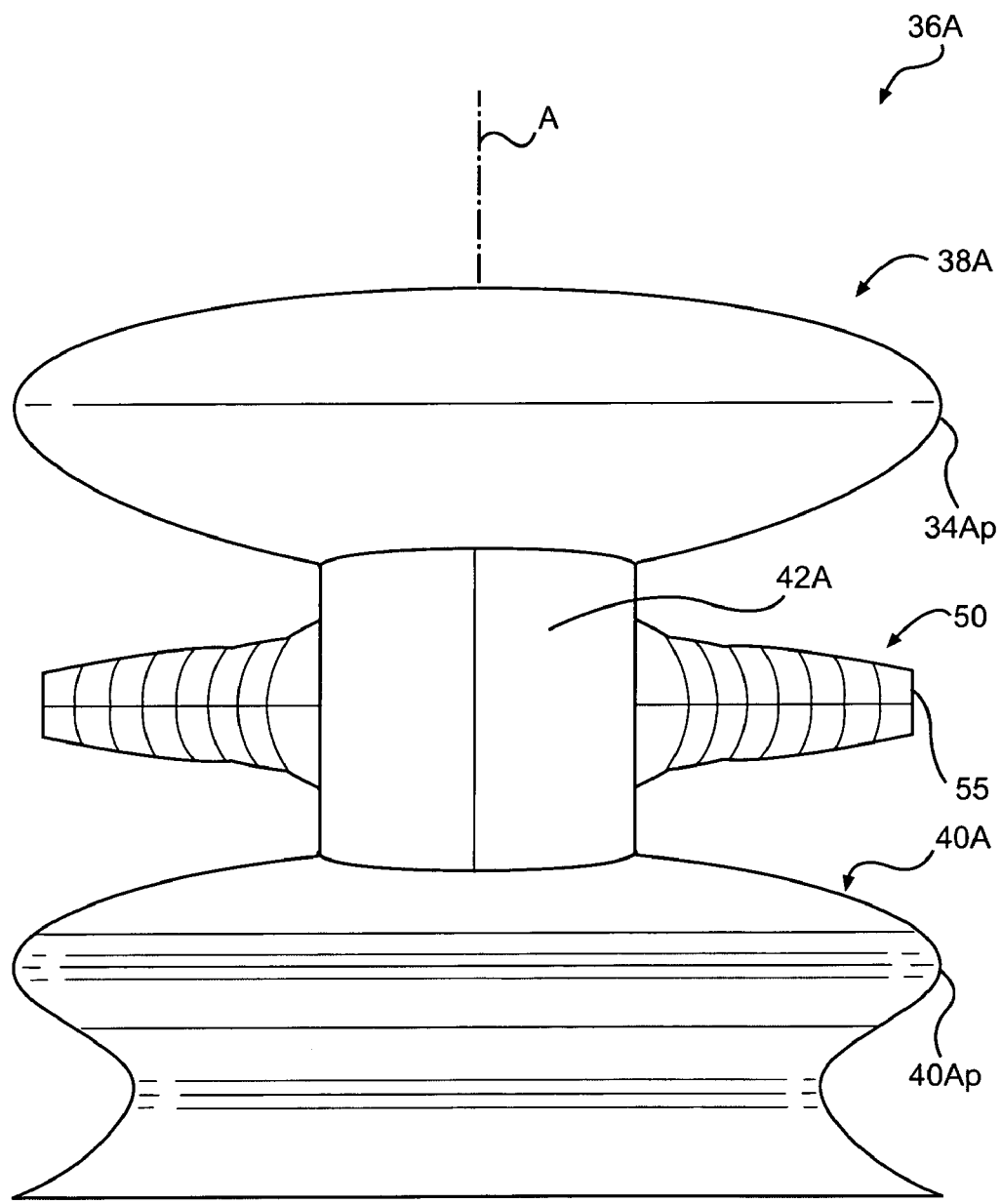
FIG. 3C is a front view of the integrated rotor hub fairing system of FIG. 3A.
Figure 3D:
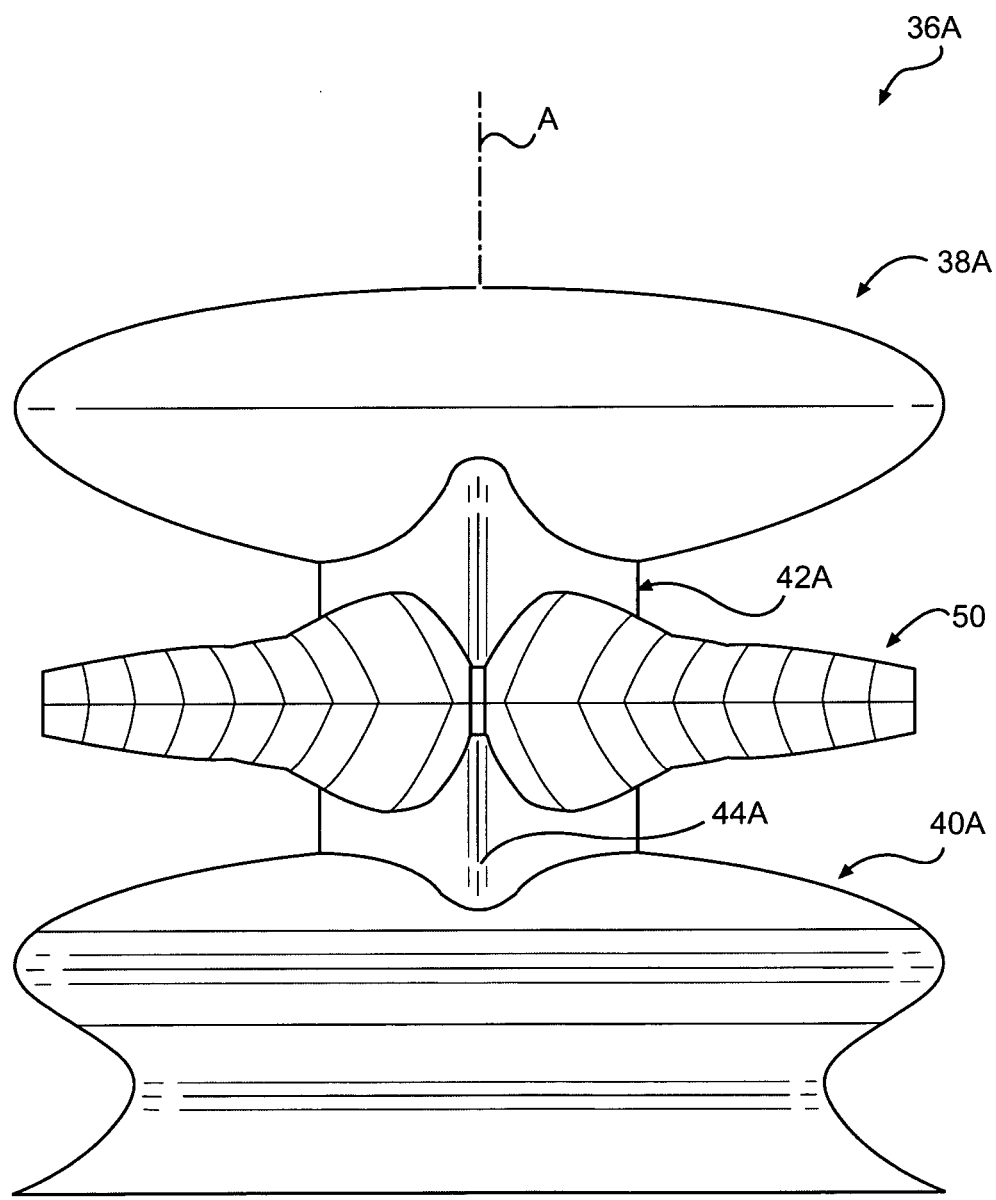
FIG. 3D is a rear view of the integrated rotor hub fairing system of FIG. 3A.

The airfoil shape of the splitter airfoil 50 is preferably shaped relative to the upper and lower hub fairing 38A, 40A contours. The splitter airfoil 50 may also be contoured in the circumferential direction to approximate the rotor hub fairing periphery 38Ap, 40Ap (FIGS. 3C and 3D). The splitter airfoil tip ends 55 preferably align closely with the freestream relative the rotor hub fairing periphery 38Ap, 4OAp so that overall edge drag is reduced. That is, the splitter airfoil 50 does not significantly extend past the periphery 38Ap, 4OAp of the upper and lower hub fairings 38A, 40A.

The splitter airfoil 50 may be sized and configured to direct the trajectory of the wake generated by the rotor hub fairing system 36A by specifically tailoring the angle of attack of the splitter airfoil 50. The airfoil shape of the splitter airfoil 50 facilitates a fixed or adjustable angle of attack to specifically tailor the rotor hub wake in a direction that reduces the impact on the airframe 14 and tail vibration. Preferably, the splitter airfoil 50 is pitched at a predetermined angle of attack along the pitch axis 52 (FIG. 3B) relative the aircraft longitudinal axis L (FIG. 1A). Alternatively or in addition, the splitter airfoil 50 may be actively articulated about the pitch axis 52 in response to particular flight profiles.

Figure 3E:
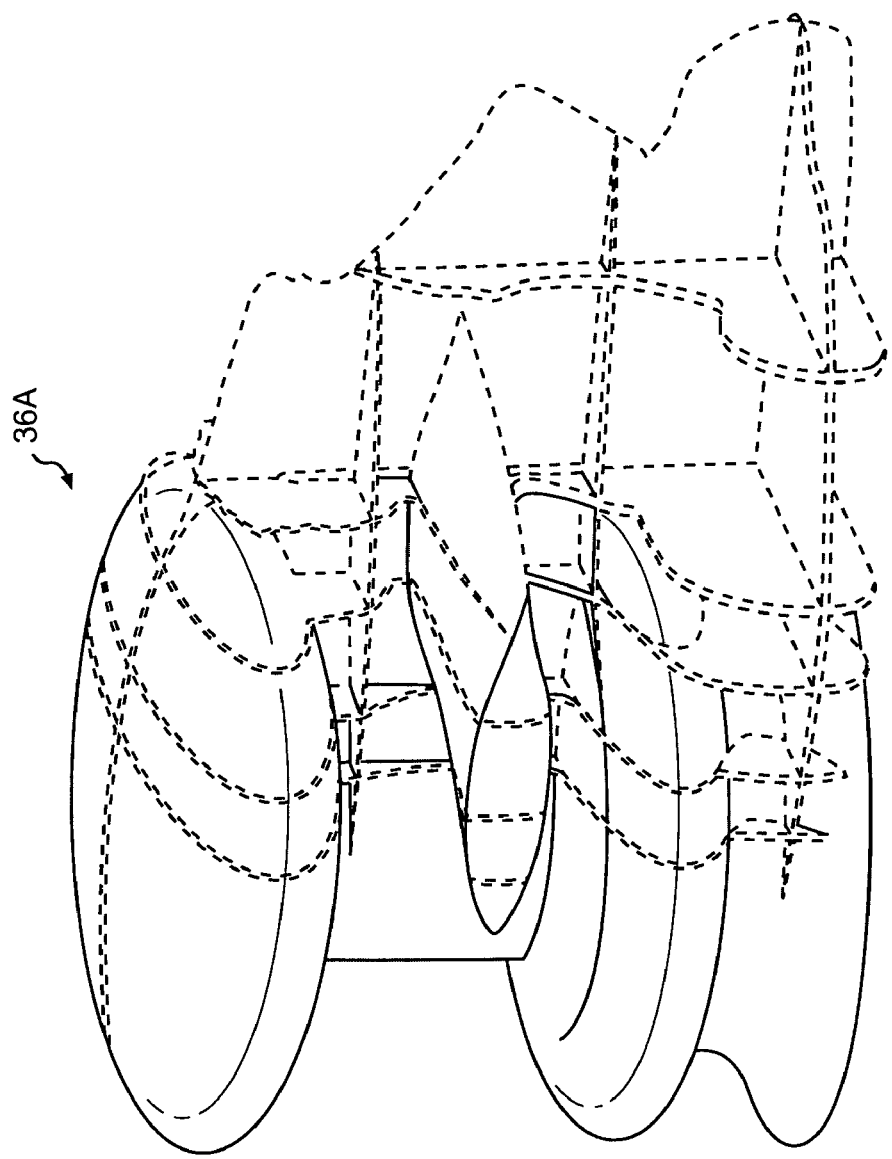
FIG. 3E is a computed total pressure contour produced by the rotor hub fairing system of FIG. 3A.

The splitter airfoil 50 reduces the effective area and increases the airflow through an aft section of the rotor hub fairing system 36A adjacent the upper hub fairing 38A and the lower hub fairing 40A to reduce flow separation. The splitter airfoil 50 also reduces the effective diffusion rate of flow which reduces the flow separation penalty on the upper and lower rotor hub fairings 38A, 40A (FIG. 3E). It should be understood that the location, size, placement and planform shape of the splitter airfoil 50 is preferably optimized to reduce separated flow on the upper and lower rotor hub fairings 38A, 40A, thus achieving improved overall drag reduction. The splitter airfoil 50 may also be used in combination with other shaft fairing designs and fillets for overall drag reduction.

Figure 4A:
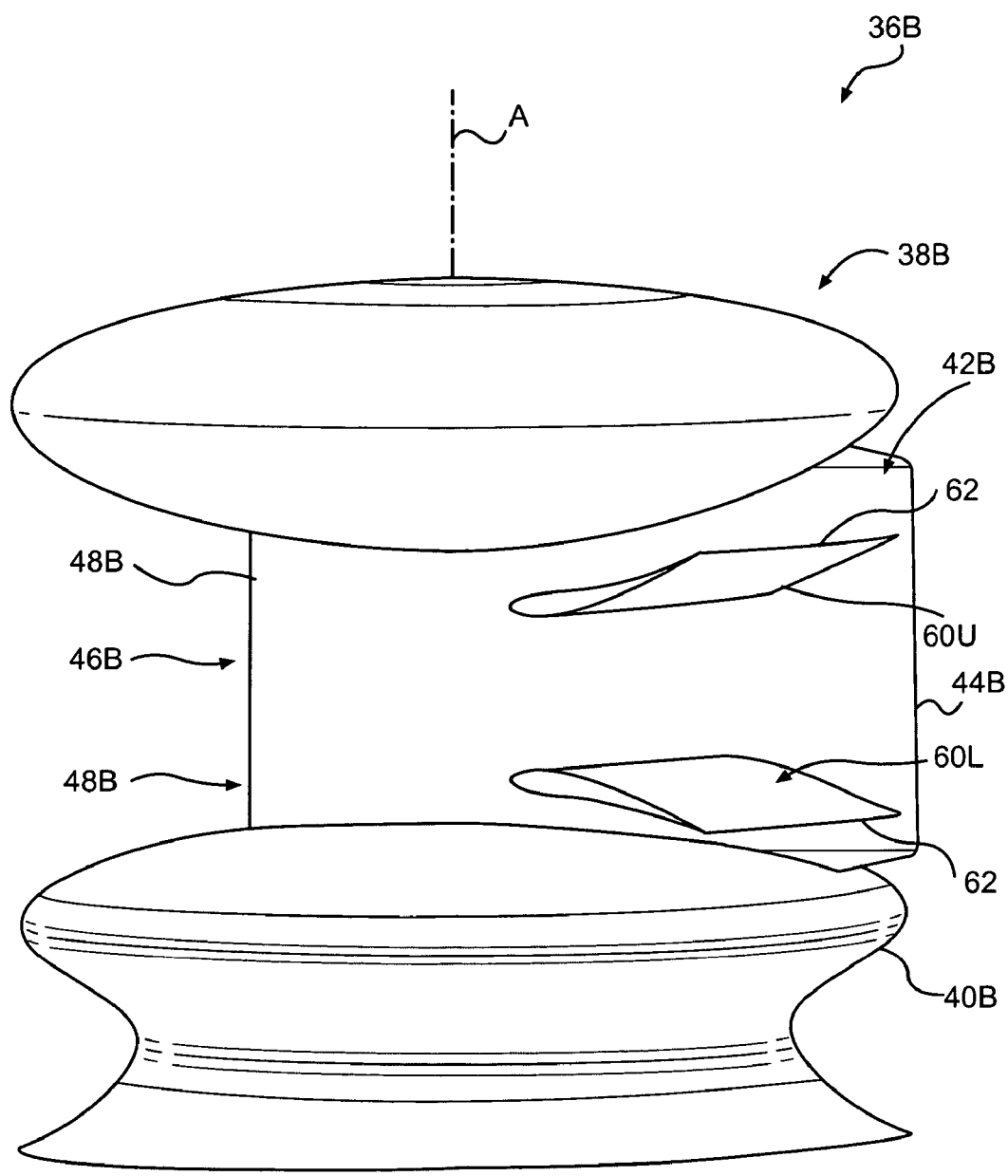
FIG. 4A is an oblique aft perspective view of another integrated rotor hub fairing system with a multitude of turning vanes.

Referring to FIG. 4A, another rotor hub fairing system 36B generally includes an upper hub fairing 38B, a lower hub fairing 40B and a shaft fairing 42B therebetween. The rotor hub fairing system 36B further includes a plurality of turning vanes 60U, 60L which extend from the shaft fairing 42B adjacent a trailing edge 44B of the shaft fairing 42B. The turning vanes 60U, 60L preferably extend from the outer shaft fairing sections 48B of the shaft fairing 42B. That is, the upper turning vane 60U and the lower turning vane 60L are respectively biased toward the upper hub fairing 38B and the lower hub fairing 40B. It should be understood that although the present invention is shown and described as having both a plurality of upper turning vanes 60U and a plurality of lower turning vanes 60L, such is not necessary and the rotor hub fairing system 36B may include a single pair of upper turning vanes 60U or a single pair of lower turning vanes 60L. Furthermore, the rotor hub fairing system 36B may incorporate a contoured shaft fairing midsection 46 as described with reference to the FIG. 2 embodiment. Moreover, as previous stated, the shaft fairing 4B may be integrated with the upper hub fairing 38B and the lower hub fairing 40B to further reduce overall drag. Furthermore, the turning vanes 60U, 60L may also be made integral with the shaft fairing 42B.

Figure 4B:
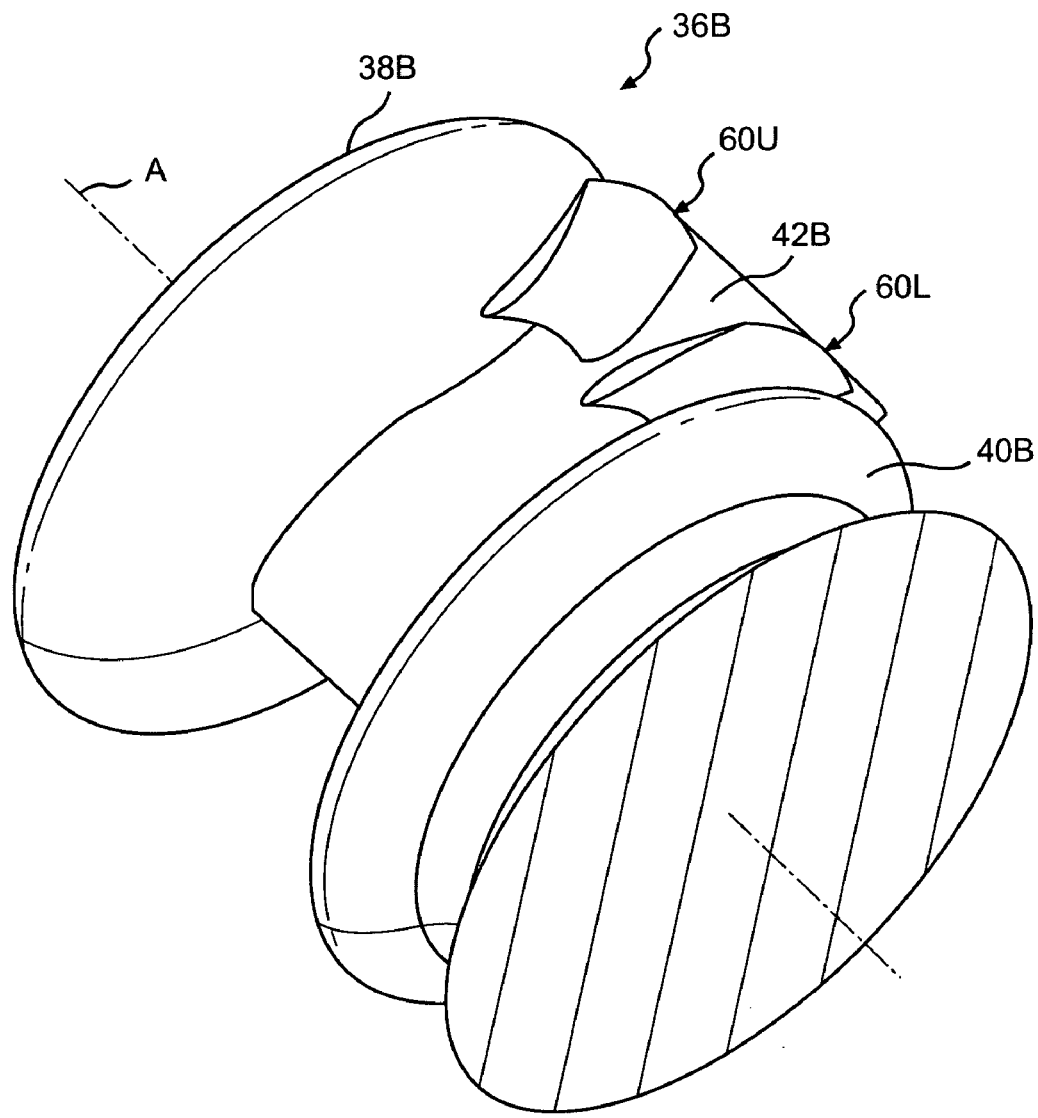
FIG. 4B is an oblique bottom perspective view of the integrated rotor hub fairing system of FIG. 4A.
Figure 4C:
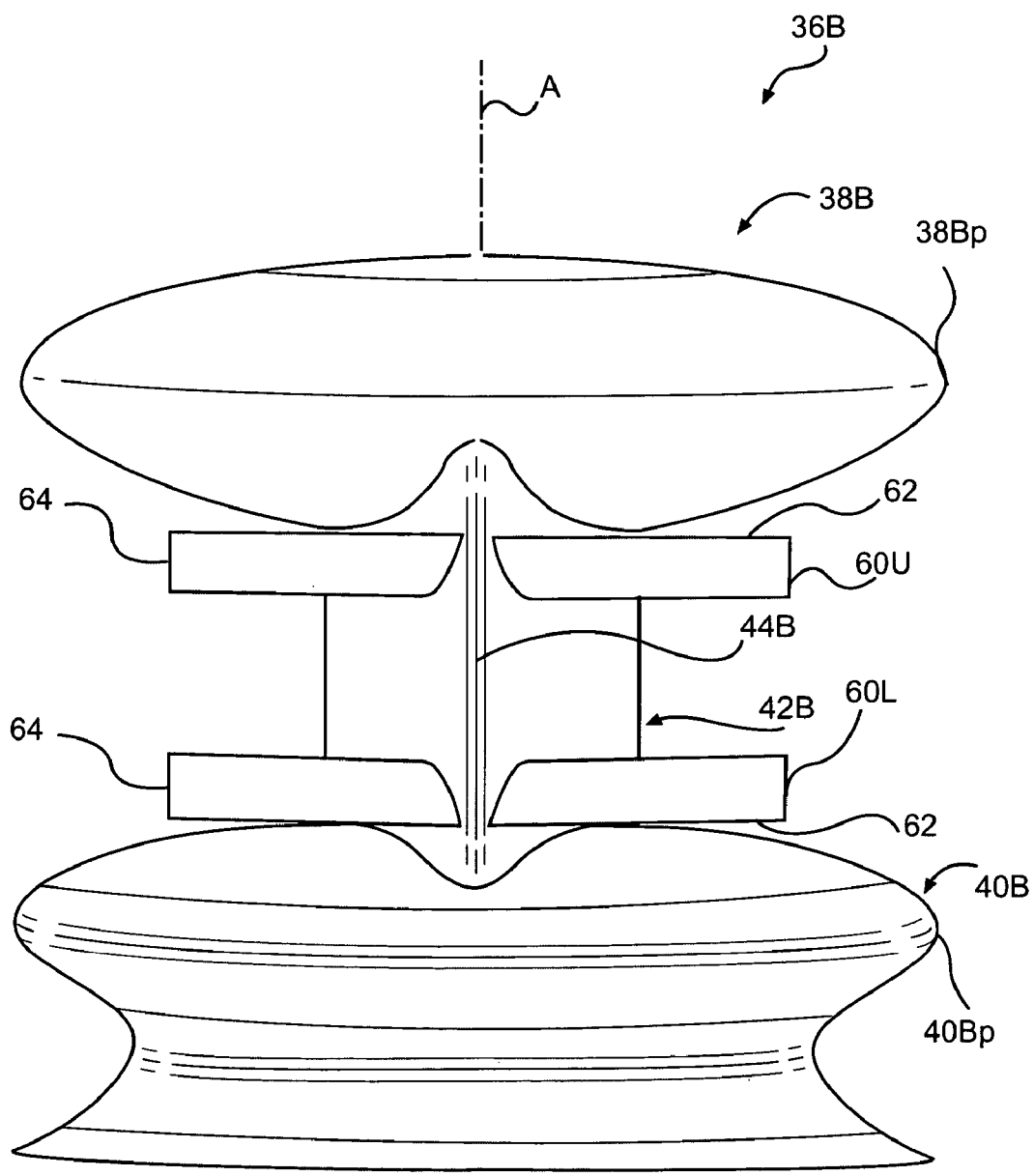
FIG. 4C is a rear perspective view of the integrated rotor hub fairing system of FIG. 4A.
Figure 4D:
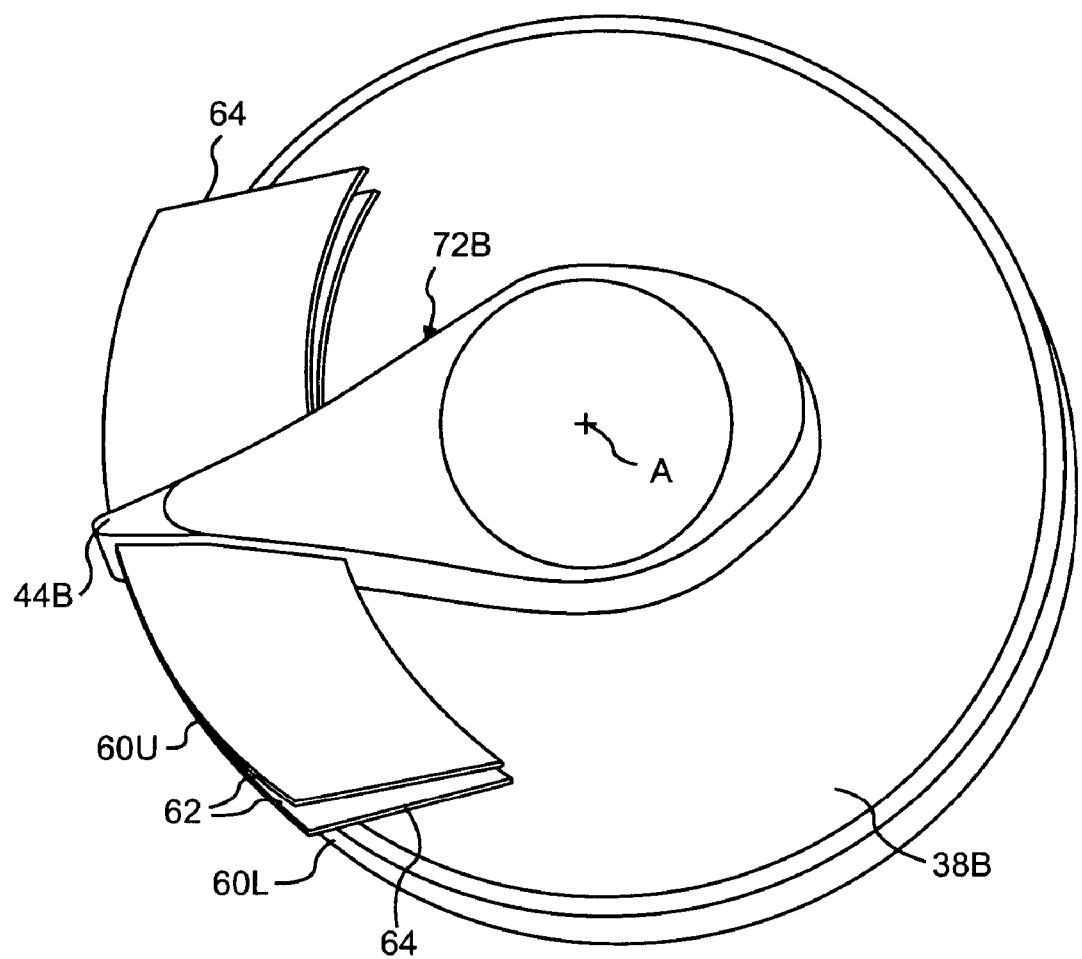
FIG. 4D is a top view of the integrated rotor hub fairing system of FIG. 4A with the upper hub fairing removed.

The turning vanes 60U, 60L are preferably shaped relative to the contours of the upper and lower hub fairings 38B, 40B. The upper turning vane 60U may be located adjacent the upper hub fairing 38B and preferably includes a camber which follows the contour of the upper hub fairing 38B while the lower turning vane 60L may be located adjacent the lower hub fairing 40B and preferably includes a camber which follows the contour of the lower hub fairing 40B (FIGS. 4B and 4C). The turning vanes 60U, 60L are also preferably contoured in the circumferential direction to approximate the circular rotor hub fairing periphery 38Bp, 40Bp (FIG. 4D) and preferably include an arcuate trailing edge 62 which follows the rotor hub fairing periphery 38Bp, 40Bp. The turning vane tip ends 64 preferably align closely with the freestream relative the rotor hub fairing outer periphery 38Bp, 40Bp (FIG. 4D) so that overall edge drag is reduced. That is, the turning vanes 60U, 60L are clipped and do not significantly extend past the periphery of the upper and lower hub fairings 38Bp, 40Bp to align the tip ends 64 parallel to a freestream airflow (FIG. 4C).

The upper and lower turning vanes 60U, 60L may be asymmetric airfoil shapes that are mirror images of each other. The turning vanes 60U, 60L are orientated such that the surface of the airfoil closest to the associated hub fairing surface approximately follows the surface on the hub fairing in a freestream airflow direction allowing for some area expansion in the direction toward the turning vane trailing edge 62. The area between the turning vanes 60U, 60L and the inner surface of the respective upper and lower hub fairings 38B, 40B gradually increases to avoid excessive diffusion and flow separation.

Figure 4E:
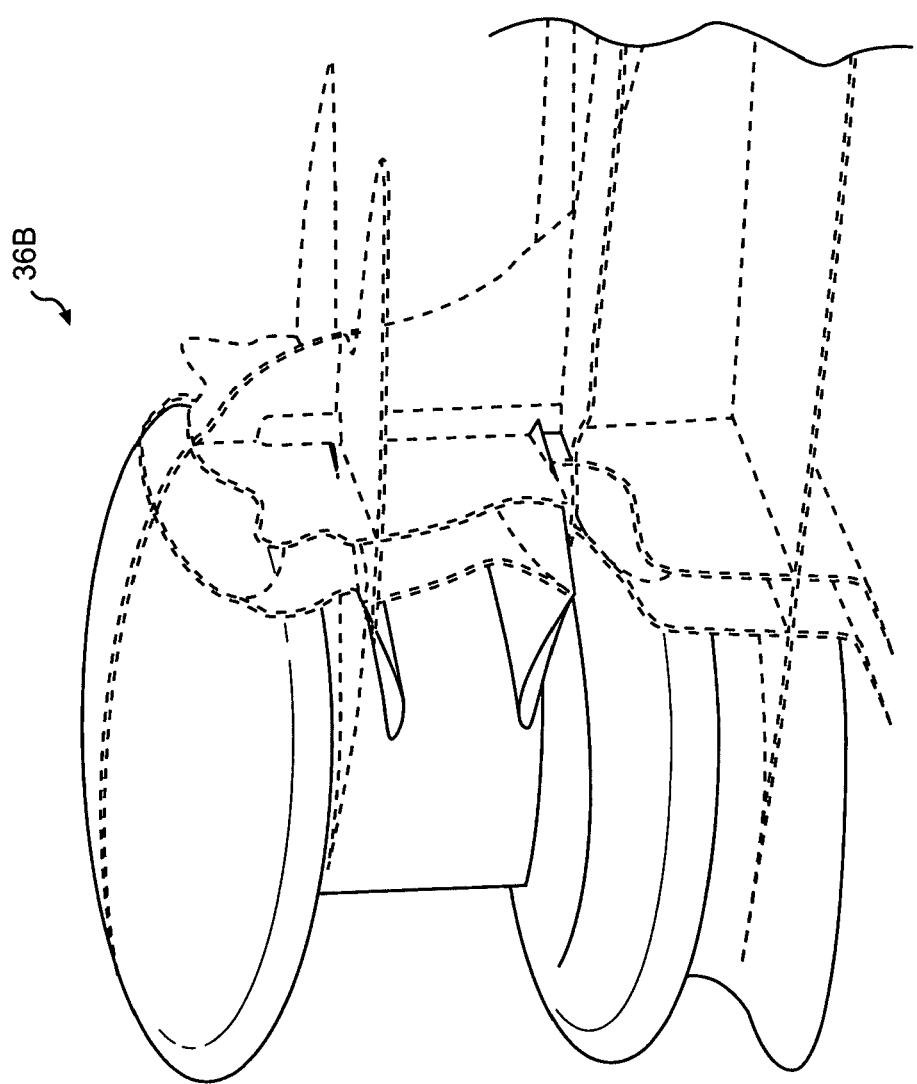
FIG. 4E is a computed total pressure contour produce by the rotor hub failing system of FIG. 4A.

The turning vanes 60U, 60L facilitate flow around the aft area of the upper and lower hub fairings 38B, 40B (FIG. 4E) which reduces flow separation and pressure drag. Tip vortex shed from the ends of the turning vanes 60U, 60L further delay flow separation.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotor hub fairing system for a coaxial rotor system comprising:
    an upper hub fairing defined about an axis;
    a lower hub fairing defined about said axis; and
    a shaft fairing between said upper hub fairing and said lower hub fairing, said shaft fairing defining an airfoil having a contoured midsection to reduce drag on the coaxial rotor system, said upper hub fairing and said lower hub fairing being rotatable with respect to said shaft fairing.

2. The rotor hub fairing system as recited in claim 1, wherein said shaft fairing is bearing mounted relative said upper hub fairing and said lower hub fairing for independent rotation relative thereto.

3. The rotor hub fairing system as recited in claim 2, wherein said pitching axis is generally parallel to an axis of rotation of the coaxial rotor system.

4. The rotor hub fairing system as recited in claim 2, wherein said pitching axis is defined at a quarter chord of said airfoil.

5. The rotor hub fairing system as recited in claim 1, wherein said shaft fairing includes an airfoil which defines a pitching axis which extends through said upper hub fairing and said lower hub fairing.

6. The rotor hub fairing system as recited in claim 1, wherein said shaft fairing is generally of an hour glass shape in a cross-section transverse to said shaft fairing taken along said axis.

7. The rotor hub fairing system as recited in claim 1, wherein said shaft fairing includes a thickness distribution in which a minimal thickness occurs within said contoured midsection.

8. The rotor hub fairing system as recited in claim 1, wherein said shaft fairing includes a NACA 0028 airfoil along said contoured midsection and an NACA 0042 airfoil adjacent said upper hub fairing and said lower hub fairing.

9. The rotor hub fairing system as recited in claim 1, wherein a trailing edge of said shaft fairing extends beyond a periphery of said upper hub fairing and said lower hub fairing.

10. The rotor hub fairing system as recited in claim 1, further comprising a splitter airfoil transverse to said shaft fairing.

11. The rotor hub fairing system as recited in claim 10, wherein said splitter airfoil extends from said contoured midsection of said shaft fairing, said shaft fairing includes a thickness distribution in which a minimal thickness occurs within said contoured midsection.

12. The rotor hub fairing system as recited in claim 10, wherein a trailing edge of said splitter airfoil extends beyond a trailing edge of said shaft fairing.

13. The rotor hub fairing system as recited in claim 10, wherein said splitter airfoil defines a maximum thickness adjacent a mid-chord position.

14. The rotor hub fairing system as recited in claim 10, wherein said splitter airfoil includes a span which is less than a diameter of said upper hub fairing.

15. The rotor hub fairing system as recited in claim 1, further comprising a plurality of turning vanes.

16. The rotor hub fairing system as recited in claim 15, wherein said plurality of vanes includes an upper turning vane and a lower turning vane.

17. The rotor hub fairing system as recited in claim 15, wherein said upper turning vane and said lower turning vane are cambered toward said respective upper and lower hub fairing.

18. The rotor hub fairing system as recited in claim 1, wherein said upper hub fairing, said lower hub fairing, and said shaft fairing are integrated to operate as a single aerodynamic element.

19. The rotor hub fairing system as recited in claim 1, wherein said shaft fairing is contoured to have a minimal thickness at a center region of said contoured midsection.

20. The rotor hub fairing system as recited in claim 1, wherein said airfoil is defined along said axis, said axis generally transverse to a freestream direction during forward flight.

21. The rotor hub fairing system as recited in claim 1, wherein said upper hub fairing and said lower hub fairing define a diameter about said axis, said shaft fairing defining said airfoil along said axis, said axis generally transverse to a freestream direction during forward flight.

22. A rotor hub fairing system for a coaxial rotor system comprising:
    an upper hub fairing defining an upper hub fairing diameter;
    a lower hub fairing defining a lower hub fairing diameter; and
    a shaft fairing between said upper hub fairing and said lower hub fairing, said shaft fairing defining a shaft fairing chord to at least one of said upper and lower hub fairing diameters (c/D) of between 0.90 D to 1.25 D, said upper hub fairing and said lower hub fairing being rotatable with respect of said shaft fairing.

23. The rotor hub fairing system as recited in claim 22, wherein said shaft fairing defines a shaft fairing chord that is between 110% to 120% chord relative to at least one of said upper and lower hub fairing diameter.

24. The rotor hub fairing system as recited in claim 22, wherein said upper hub fairing diameter is generally equal to said lower hub fairing diameter.

25. The rotor hub fairing system as recited in claim 22, wherein said shaft fairing includes a thickness distribution in which the minimal thickness occurs within a contoured midsection.

26. The rotor hub fairing system as recited in claim 22, wherein a trailing edge of said shaft fairing extends beyond said upper hub fairing diameter.

27. The rotor hub fairing system as recited in claim 22, wherein said airfoil is defined along said axis, said axis generally transverse to a freestream direction during forward flight.

28. A coaxial rotor system comprising:
- an upper rotor system including an upper rotor hub which rotates about an axis of rotation;
- an upper hub fairing which at least partially surrounds a portion of said upper rotor hub;
- a lower rotor system including a lower rotor hub which rotates about said axis of rotation;
- a lower hub fairing which at least partially surrounds a portion of said lower rotor hub; and
- a shaft fairing between said upper hub fairing and said lower hub fairing, said shaft fairing having a pitching axis generally parallel to said axis of rotation, said upper hub fairing and said lower hub fairing being rotatable with respect to said shaft fairing.

29. A rotor hub fairing system for a coaxial rotor system comprising:
- an upper hub fairing defined about an axis;
- a lower hub fairing defined about said axis;
- a shaft faring between said upper hub fairing and said lower hub fairing, said shaft fairing including a thickness distribution in which a minimal thickness occurs within a contoured midsection; and
- a splitter airfoil mounted transverse to said shaft fairing.

* * * * *

UNITED STATES PATENT AND TRADEMARK OFFICE
CERTIFICATE OF CORRECTION

PATENT NO. : 7,229,251 B2 Page 1 of 1
APPLICATION NO. : 11/141246
DATED : June 12, 2007
INVENTOR(S) : Bertolotti et al.

It is certified that error appears in the above-identified patent and that said Letters Patent is hereby corrected as shown below:

Claim 22, Column 8, line 55: "of" should read as --to--

Signed and Sealed this

Fourteenth Day of August, 2007

JON W. DUDAS
*Director of the United States Patent and Trademark Office*